United States Patent
Sklovsky et al.

(10) Patent No.: US 8,428,513 B2
(45) Date of Patent: Apr. 23, 2013

(54) METHODS, SYSTEMS AND APPARATUS FOR SELECTING AN APPLICATION IN POWER-OFF MODE

(75) Inventors: Valdimir Sklovsky, Northbrook, IL (US); Greg R Black, Vernon Hills, IL (US); Mark R Braun, Elgin, IL (US)

(73) Assignee: Motorola Mobility LLC, Libertyville, IL (US)

( * ) Notice: Subject to any disclaimer, the term of this patent is extended or adjusted under 35 U.S.C. 154(b) by 574 days.

(21) Appl. No.: 12/412,592

(22) Filed: Mar. 27, 2009

(65) Prior Publication Data

US 2010/0248710 A1  Sep. 30, 2010

(51) Int. Cl.
*H04B 5/00* (2006.01)
*H04B 7/00* (2006.01)

(52) U.S. Cl.
USPC .......................................... 455/41.2; 455/558

(58) Field of Classification Search .................. 455/41.1, 455/41.2, 418, 419, 420, 558
See application file for complete search history.

(56) References Cited

U.S. PATENT DOCUMENTS

| | | | |
|---|---|---|---|
| 5,757,365 A | 5/1998 | Ho | |
| 6,710,578 B1 * | 3/2004 | Sklovsky | 320/127 |
| 7,659,892 B2 * | 2/2010 | Tanada et al. | 345/211 |
| 2006/0094405 A1 | 5/2006 | Dupont | |
| 2006/0135100 A1 | 6/2006 | Fang et al. | |
| 2006/0290496 A1 | 12/2006 | Peeters | |
| 2007/0293155 A1 | 12/2007 | Liao et al. | |
| 2010/0302006 A1 | 12/2010 | Subramanian | |

FOREIGN PATENT DOCUMENTS

| | | |
|---|---|---|
| JP | 2008-270929 A * | 6/2008 |
| WO | 2007122439 A1 | 1/2007 |
| WO | 2009147094 A1 | 12/2009 |

OTHER PUBLICATIONS de Biolley, Luc: The International Search Report and The Written Opinion of the International Searching Authority, European Patent Office, Rijswijk, completed: Jun. 9, 2010, mailed: Jun. 15, 2010, all pages.
MPINJ MONZA® X-2K and X-8K Dura Chips Deliver Exciting New Benefits to Manufacturers of Consumer Electronics, http://www.impinj.com/News_and_Events/Press_Releases/2012/Impinj_Monza_X-2K_and_X-8K_Dura_Chips_Deliver_Exciting_New_Benefits_to_Manufacturers_of_Consumer_Electronics.aspx, May 23, 2012, all pages.
RFID Business Applications, http://www.rfidjournal.com/article/articleprint/1334/-1/1, Oct. 28, 2012, all pages.
Fast and Secure Service With RFID-Tagged Phones, http://www.smartrac-group.com/en/success-stories-fast-and-secure-service-with-rfid-tagged-phones.php, Oct. 28, 2012, all pages.
Bernd Schoner, Embedded RFID: Why we got excited about passive RFID in the first place!, http://rfid.thingmagic.com/rfid-blog/?month=10&year=2012, Oct. 24, 2012, all pages.

* cited by examiner

*Primary Examiner* — Dean O Takaoka
(74) *Attorney, Agent, or Firm* — Gary J. Cunningham

(57) ABSTRACT

An embodiment relates generally to a method of selecting applications. The method includes positioning a powered-down mobile device into a close proximity of a near field communication device and selecting an application from a plurality of applications stored on the powered-down mobile device. The method also includes executing the application in the powered-down mobile device to interact with the near field communication device.

14 Claims, 3 Drawing Sheets

(12) United States Patent
US 8,428,513 B2

METHODS, SYSTEMS AND APPARATUS FOR SELECTING AN APPLICATION IN POWER-OFF MODE

FIELD

This invention relates to selecting applications in a mobile device, more particularly, to methods, systems and apparatus for selecting an application in a mobile device while in a power-off mode.

DESCRIPTION OF THE RELATED ART

Near field communication ("NFC") is a short range (e.g., hands width) wireless technology mainly aimed at usage in mobile phones. NFC is an approved ISO/IEC standard (18092) and an ECMA standard (ECMA-340). Possible applications for NFC enabled mobile telephones include electronic keys, electronic money, electronic wallet (or smart wallet), electronic tickets, travel cards, identity documents, mobile commerce, etc.

NFC generally works by magnetic field induction. It operates within the globally unlicensed radio frequency band of 13.56 MHz. NFC devices have a working distance of approximately zero to twenty centimeters and a data transfer speed from about 100 kb/s to 1 Mb/s.

NFC devices can have two modes of communication: a passive communication mode and an active communication mode. In the passive communication mode, an initiator device provides a carrier field and a target device answers by modulating an existing field. Accordingly, the target device may draw its operating power from the initiator-provided electromagnetic field, thus making the target device a transponder. In the active communication mode, both initiator and target device communicate by generating their own field. As a result, both devices typically need to have a power supply.

A mobile telephone complying with NFC standards is required to work in a battery off (or power off) mode for a card emulation mode (including European Telecommunications Standard Institutes ("ETSI") Smart Card Platform (SCP)). This mode would provide minimal functionality for emergency cases in order to use for transportation, making a payment and/or receiving payment.

A current solution exists where the power and clock are extracted from the radio frequency identification ("RFID") field by a NFC transceiver. The device includes a frequency rectifier and a clock generating circuitry. This provides power (and clock optionally) for the NFC Secure Element (SE). Due to the limited energy of generated RF field from external NFC devices, there is possibility to supply very limited power for NFC controller and SE only. As a result, the user can not use a regular mobile mode with any user interfaces, e.g., User Interface (UI) or Man-Machine Interface (MMI), in order to select applications. The SE is a dynamic environment, where applications are downloaded, personalized, managed and removed independently with varying life cycles and is implemented using subscriber identity module ("SIM"), secure digital ("SD") card or other similar technology. Thus, the SE includes NFC applications, particularly, card emulation applications, needed for the battery off mode.

Although an NFC mobile can use a default application in the battery off mode, a user can encounter a situation where the default application is the wrong application. For example, an NFC mobile default application can be set to a ticket application and the user needs cash to pay for a food purchase. Accordingly, there is a need to be able to switch and load NFC applications while in a battery off mode.

SUMMARY

An embodiment relates generally to a method of selecting applications. The method includes positioning a powered-down mobile device into a close proximity of a near field communication device and selecting an application from a plurality of applications stored on the powered-down mobile device. The method also includes executing the application in the powered-down mobile device to interact with the near field communication device.

Another embodiment pertains generally to an apparatus for selecting an application. The apparatus includes a secure element configured to store at least two applications and at least one input button is coupled to the secure element. The at least one input button is configured to accept a selection sequence to select one of the at least two applications in a power off mode.

Yet another embodiment relates generally to a system for selecting an application in a power off mode. The system includes a near field communication device emitting a radio frequency identification field in accordance with near field communications standards and a mobile device that includes a secure element configured to store at least two applications and at least one input means is coupled to the secure element, wherein the at least one input means is configured to accept a selection sequence that the secure element decodes to select one of the at least two applications in a power off mode while in the radio identification field.

Accordingly, a user with a NFC and RFID compliant mobile device can select an application from multiple applications while in a battery off mode. As a result, a user can be enabled with a higher set of functionality to respond to differing emergency situations.

BRIEF DESCRIPTION OF THE DRAWINGS

Various features of the embodiments can be more fully appreciated, as the same become better understood with reference to the following detailed description of the embodiments when considered in connection with the accompanying figures, in which.

DETAILED DESCRIPTION OF EMBODIMENTS

Figure 1:
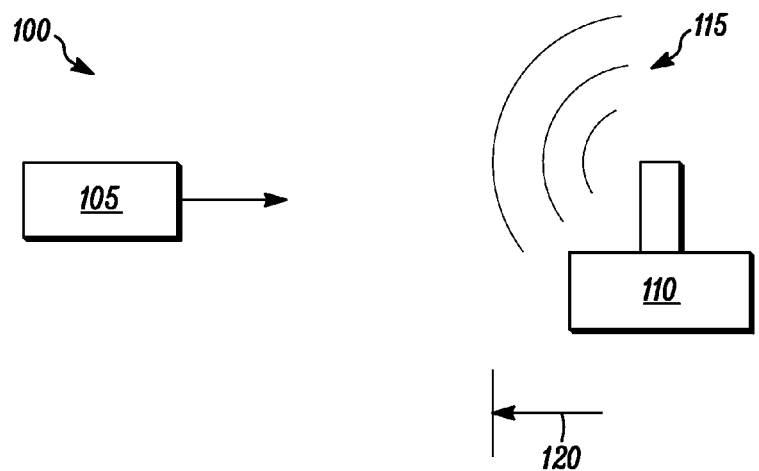
FIG. 1 depicts an exemplary system in accordance with an embodiment.

For simplicity and illustrative purposes, the principles of the present invention are described by referring mainly to exemplary embodiments thereof. However, one of ordinary skill in the art would readily recognize that the same principles are equally applicable to, and can be implemented in, all types of mobile communication systems, and that any such variations do not depart from the true spirit and scope of the present invention. Moreover, in the following detailed description, references are made to the accompanying figures, which illustrate specific embodiments. Electrical, mechanical, logical and structural changes may be made to the embodiments without departing from the spirit and scope of the present invention. The following detailed description is, therefore, not to be taken in a limiting sense and the scope of the present invention is defined by the appended claims and their equivalents.

Embodiments pertain generally to methods and apparatus for selecting an application from an electronic wallet storing multiple applications in a battery (or power) off mode. More particularly, a mobile device can be configured to allow a user to select from multiple applications based on the power drawn from proximity to another near field communication ("NFC") device while the mobile device is powered down.

When the powered down mobile device enters the operating proximity of another NFC device, the mobile device can draw enough power from the RFID field to power a Secure Element (SE) of an NFC module or modem. The user can then select one application from multiple applications stored in an electronic wallet based on a sequence of key-presses on a key, button or input means. The Secure Element can decode the sequence of key-presses to select an application, which is then executed. Examples of the application can be a ticket application to pay fares on mass transit, a credit card application, a library card, etc.

Generally, the sequence of key presses can be combinations of different time intervals of pressing a key. In some embodiments, the sequence of key-presses can be a long key-press as one sequence, two short key-presses can be a second key-press or a short key-press followed by a longer key-press can be a third sequence. Each sequence can then be associated with an application for the user to activate. Some mobile devices that are NFC-enabled are equipped with a dedicated NFC key. Accordingly, the user can use one NFC key to input the appropriate selection sequence to select an application from the preloaded applications. Alternatively, the power key can be used to input selection keys for mobile devices without a dedicated NFC button as well as mobile devices with a dedicated NFC button. Alternatively the user can select an application by activating one of multiple keys.

In some embodiments, a user can assign the selection sequence when the mobile device is powered-on. For example, the mobile device can be configured to display a screen to associate an application with a selection sequence.

FIG. 1 illustrates an exemplary system 100 in accordance with an embodiment. It should be readily apparent to those of ordinary skill in the art that the system 100 depicted in FIG. 1 represents a generalized schematic illustration and that other components may be added or existing components may be removed or modified.

As shown in FIG. 1, the system 100 includes a mobile device 105 and a NFC device 110. The mobile device 105 and the NFC device 110 can comply with NFC standards such as EMC-340 and ISO/IEC 18092 and any subsequent revision or any superseding standard as well as RFID standards such as ISO14443, ISO15693 and any subsequent revision or any superseding standards. These NFC standards and RFID standards are hereby incorporated by reference in their entirety.

The mobile device 105 can store multiple NFC applications within a Secure Element ("SE") and can be in a battery off mode state. The mobile device 105 can be implemented as a mobile device, a mobile computing device, a personal digital assistant, a music player or any other portable electronic device.

The NFC device 110 can be any type of initiator device such as a point-of-sale terminal, kiosk, ticket counter, reader, etc. The NFC device 110 can generate a radio frequency identification ("RFID") field 115 with a minimum magnetic field strength 120 as specified by the NFC and RFID standards. In some embodiments, the minimum magnetic field strength, H, can be set to 1.5 A/m. However, not all RFID readers in their respective NFC devices 110 generate the same magnetic field, H. Accordingly, each NFC device 110 may have different working proximity ranges from another NFC device. Thus, the mobile device 105 should be placed close as possible to the NFC device 110 to ensure proper operation.

As the mobile device 105 enters into close proximity (the RFID field 115) of the initiator device 110, the user can select the appropriate NFC application for the initiator device 110. More particularly, the mobile device 105 can draw enough power from the RFID field 115 to power the SE of an NFC modem (not shown) in the mobile device 105. The user can then select one NFC application from multiple NFC applications stored in the SE based on a sequence of key-presses on either a dedicated NFC button or a power button. The SE can decode the sequence of key-presses to select the appropriate NFC application, which is then executed.

For the mobile device 105 to select an application in the battery off mode, the SE can be coupled to the dedicated NFC button of the keypad of the mobile device 105. Accordingly, when the SE becomes energized in the presence of the RFID field 115, the user can enter input sequences (e.g., long key press, two short key press, or short key press-long key press) to select the application. In some embodiments, the NFC button or another specialized key can be located on another location on the mobile device 105 such as top cover of a flip mobile telephone or a side of the mobile device 105.

Similarly, the power key or button of the keypad can be coupled to the SE to use the power button to enter the appropriate key press sequence. The power button can be configured to short the input of the SE to ground during a key-press when entering the selection sequences. More specifically, the power key typically has one terminal connected to the mobile device 105 power management IC (or processor) which is connected to the power supply through a weak pull-up resistor, and the other terminal to ground. When the key is not being pressed, the input is pulled high. When the key is pressed, it grounds the input to the power management IC (pulls it low). A similar configuration could be used for the dedicated NFC key.

Accordingly, the topology is readily adaptable to being used for battery off mode detection. The signal is connected to the SE (as well as to the power management IC). The SE provides a weak pull-up when the SE is activated during battery off mode, with pull-up voltage generated from the RFID field. When the key is not pressed, the SE observes a logic high. When the key is pressed, the SE then observes a logic low. A similar configuration could be used for the dedicated NFC key. Thus, the SE can be powered by the RFID field of a NFC device.

In other embodiments, the SE can also be powered by any residual power left in a battery as well in combination with the RFID field. More particularly, in the event that the battery has been drained and prevent the operation of the mobile device, a residual charge may remain left in the battery. The residual charge may not be enough to power the mobile device but enough to power the SE. Accordingly, the SE can be powered by the residual charge remaining in the battery of the mobile device as well as in combination with the RFID field of a NFC device.

Figure 2:
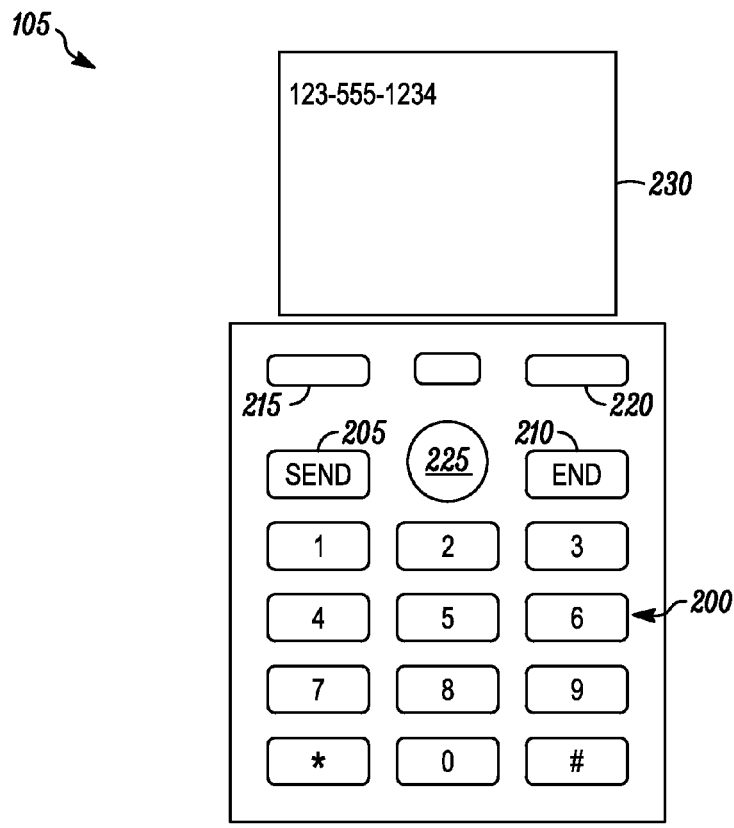
FIG. 2 shows an exemplary keypad for a NFC compliant mobile device in accordance with an embodiment.

FIG. 2 shows an exemplary keypad 200 of a mobile device 105 in accordance with another embodiment. It should be readily apparent to those of ordinary skill in the art that the keypad 200 depicted in FIG. 2 represents a generalized schematic illustration and that other components may be added or existing components may be removed or modified.

As shown in FIG. 2, the keypad 200 can include a Bell keypad for numbers 1-10 along with a character "*" and a character "#" in a 3×4 matrix where the keypads for 1, 2, and 3 are on the top-row. The keypad 200 can also include a SEND key 205 and an END key 210. The SEND key 205 may be configured to initiate a telephone call for an entered telephone number and/or person. The END key 210 can be configured to terminate a call.

The keypad 200 can also include a dedicated NFC key 215 and a power button 220. A scroll widget 225 can be configured to navigate the menus on a liquid crystal display ("LCD") display 230. In some embodiments, the keypad 200 may be emulated on the display 230 and may also be a QWERTY keyboard or other keyboard layout. In one embodiment, the display 230 can include a bistatic display portion or a separate additional display, for example, configured to indicate a selection sequence in a power off mode. In more detail, when in a power off mode, the bistatic display will normally display the text at power down. In this embodiment, at power down, the display is programmed, such that a selection sequence is displayed. Examples of bistatic displays are electrophoretic displays, e-paper displays, and e-ink™ displays.

The display could provide instructions such as: For an electronic wallet application press once. For a ticketing application press twice. For an identity management application three times. For a debit card application press four times, etc. The instructions could be in text or symbols or a combination thereof. For example a pictogram or business logo could be displayed in lieu of a textual description of an application, and a number of dots, dashes or other symbols could be displayed to indicate the number of presses.

Alternatively the bistatic display may be used to indicate applications corresponding to labeled buttons or keys. The indication may be textual, symbolic or a combination thereof. For example, the display could provide instructions such as: For an electronic wallet application press "1". For a ticketing application press "2". For an identity management application press "3". For a debit card application press "4", etc.

Alternatively an application and corresponding button or key may be linked by associating the color, pattern or shading of a textual or pictographic description rendered on a bistatic display to the color, pattern or shading of a corresponding button or key.

Alternatively the choice of the appropriate button or key may be indicated by positioning of the symbol or text relative to the button or key, or by pointing symbols such as lines or arrows, or a combination of pointing symbols and positioning.

Figure 3:
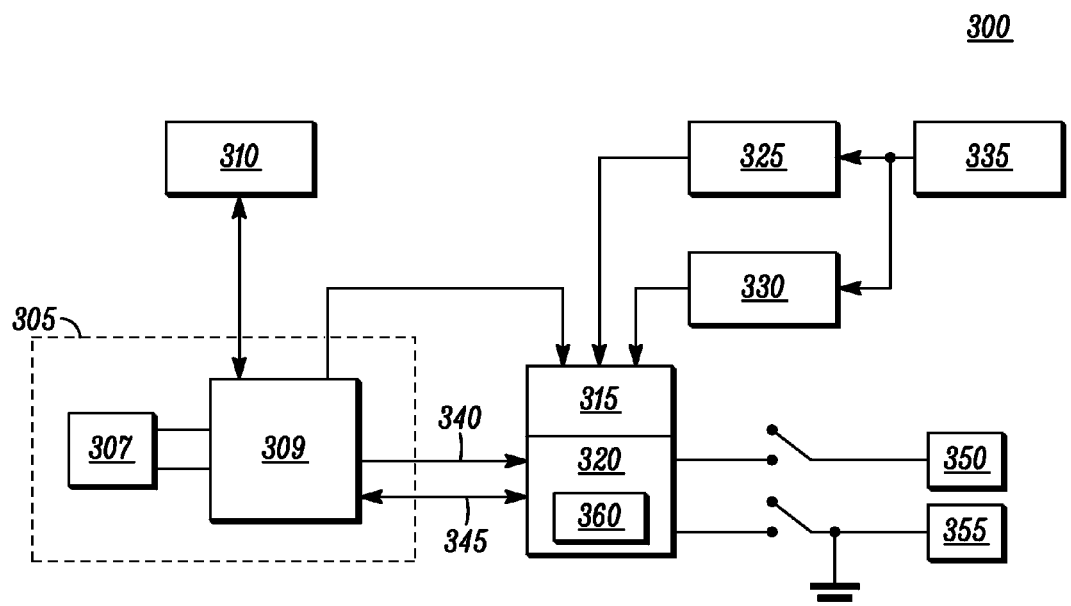
FIG. 3 illustrates a block diagram of an NFC adapter in a mobile device in accordance with yet another embodiment.

FIG. 3 illustrates a partial block diagram 300 of the mobile device 105 equipped with an NFC modem 305 in accordance with another embodiment. It should be readily apparent to those of ordinary skill in the art that the block diagram depicted in FIG. 3 represents a generalized schematic illustration and that other components may be added or existing components may be removed or modified.

As shown in FIG. 3, the mobile device 105 can comprise a mobile central processing unit ("CPU") 310, a power input switch 315, a SE 320, DC/DC low power converter 325 and a low dropout regulator 330. The mobile CPU 310 can provide the computing power and an execution platform for the functionality of the mobile device 105 during the normal mode of operation.

The power input switch 315 can be configured to direct power to the SE 320 from various sources. More particularly, the SE 320 can draw power from the RFID field through the NFC modem 305, the DC/DC low power converter 325 and/or the low dropout regulator 330. The DC/DC low power converter 325 and the low dropout regulator 330 can be coupled to the battery 335 of the mobile device 105. The DC/DC low power converter 325 can provide residual battery power in the event of a low battery. The low dropout regulator 330 can be configured to provide the appropriate voltage to the SE 320 while the battery 335 is not in a low state.

In some embodiments, the DC/DC low power converter 325 can also provide the residual power from the battery 335 in the event the battery 335 is in a low state or powered off with sufficient charge on the battery 335. The low state of the battery 335 may not provide enough power to provide full functionality of the mobile device 105 but can provide enough power to energize the SE 320 for operation. Accordingly, the user can select an application using the residual power left on a low state battery 335 as well as drawing power from the RFID field of an NFC device. Moreover, the residual power of the battery can increase the operating range surrounding a NFC device to make the application selection as opposed to being singularly powered by the RFID field of the NFC device.

Even when the battery 335 contains sufficient power to the mobile device 105, a user may not want to power on the mobile device 105. For example, the mobile device can be in a restricted area where cellular communication is banned (e.g., hospital, airplane, etc.) but the user wants to use one of the applications stored on the SE 320. The user can select and use an application based on the power from the low dropout regulator 330 to power the SE to select the appropriate application. Another scenario can be the user approaching a NFC device with the mobile device 105 powered off. Instead of waiting for the mobile device 105 to power up, the user can use the power from the low dropout regulator 330 to power the SE to select the appropriate application for the respective NFC device.

The NFC modem 305 can be comprised of an RFID antenna 307 and a NFC/RFID controller 309. The RFID antenna 307 can be coupled to the NFC/RFID controller 309. The RFID antenna 307 can be configured to transmit and receive RFID signals operating at a frequency of about 13.56 MHz. Received signals are passed to the NFC/RFID controller 309 and transmitted signals are received from the NFC/RFID controller 309.

The NFC/RFID controller 309 can be configured to convert any RFID, NFC communication into a format that can be processed by the SE 320 according to the NFC standards. Similarly, the NFC/RFID controller 309 can convert any information from the SE 320 into RFID transmission to another NFC device. The NFC/RFID controller 309 can also pass a clock signal 340 and interchange data on a data bus 345.

The SE 320 can be configured to store various NFC applications such as electronic wallet application, a ticketing application, an identity management application, a debit card application, etc. The SE 320 can be implemented with a SIM module or SD card as known to those skilled in the art.

In accordance with various embodiments, a NFC key 350 of the keypad 200 of the mobile device 105 can be coupled to the SE 320. In other embodiments for phones without an NFC key 350, a power key 355 of the mobile device 105 can be coupled to the SE 320. In this configuration, the power key 355 can also be configured to ground the input of the SE when pressed. Accordingly, a dedicated NFC key 350 or the power key 355 can be used as a single key to select an application.

In yet other embodiments, multiple keys can be used to select an associated application. More particularly, for mobile devices with a dedicated NFC key and a power key, a first application can be assigned to the NFC key and a second application can be assigned to the power key. Accordingly, a user can switch between the two applications by pressing the appropriate key.

In some embodiments, any key or button of the keypad 200 can be used to select the appropriate application. More specifically, the row and column lines of any key can be connected to the SE 320 in addition to the CPU 310, which is also configured to tri-state the row and column lines when powered off. The SE 320 can place a weak pull-up on the column signal when powered by the NFC initiator device and assert the row signal low. The SE 320 can then detect when the key is pressed by the column signal being pulled low. During normal operations, the SE 320 can tri-state the row and column signals and disable the pull-ups to avoid disrupting normal keypad operation.

The SE 320 can also store applets such as the selector applet 360. The selector applet 360 can be configured to receive a key press sequence from a user to select an application from the multiple NFC applications stored within the SE 320. In some embodiments, the selector applet 360 can also allow the user to associate a particular key press sequence with an application. Other embodiments envision a configuration applet to allow the user to associate a key press sequence with a respective application.

Figure 4:
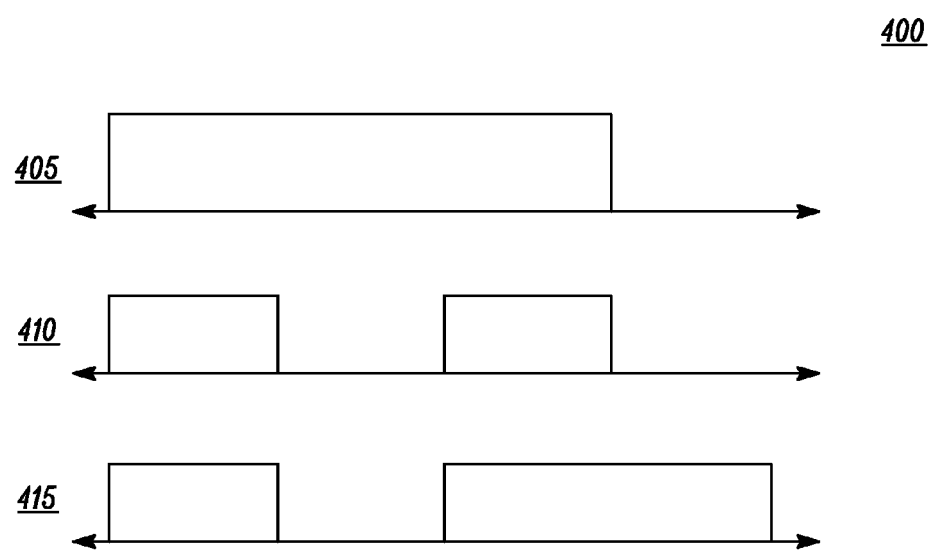
FIG. 4 depicts a series of key presses sequences in accordance with yet another embodiment.

FIG. 4 illustrates selection sequence for the selector module 400 in accordance with yet another embodiment. As previously mentioned, a selection sequence is a combination of different time intervals on a key, where the definition of a short or long time interval can be predetermined. As shown, in FIG. 4, selection sequence 405 is a sequence of depressing a button or key for a long time interval (e.g., >1 second). Selection sequence 410 is a sequence of depressing one short time interval followed by another short time interval on a key or button. Selection sequence 415 is sequence of depressing a short time interval followed by a long time interval on a key or button.

For the embodiments with two-button selection, either the NFC key 350 or the power key 355 can initiate the selection sequence with a first button followed by the other button receiving the second half of the selection sequence. For example, for key press sequence 410, the user can input the short key press with the NFC key 350 (or the power key 355) followed the short key press with the power key 355 (or NFC key 350). For selection sequence 405, either NFC key 350 or the power key 355 can be used for the long time interval as the respective key or input means in some embodiments.

While the mobile device 105 is powered on, a user can use the selector module 460 to associate a selection sequence with a respective application as shown in FIG. 4. The selection sequences 405-415 depicted in FIG. 4 allow a user to select between at least three applications. For mobile devices equipped with a limited memory space in the SE, a toggle mode can be implemented for a user to select between two applications. More particularly, a mobile device 105 can be configured to store two applications in the SE 320 and the user can select the other application by pressing the NFC key 350 or the power key 355. For example, the mobile device 105 can have application one (e.g., a ticketing application) selected. As the mobile device 105 enters the proximity of an NFC initiator device, the application one is executed. To select application two, the user can bring the mobile device 105 into the proximity of the NFC initiator device while pressing the NFC key 350 (or power key 355) or pressing the NFC key 350 (or power key 355) after entering the field.

Subsequently, the mobile device 105 is then configured with application two as a default application. Accordingly, as the mobile device 105 enters the proximity of another NFC initiator device, application two can execute. A user can then toggle back to application one by pressing the NFC key 350 (or power key 355) as the mobile device 105 enters the proximity of the second NFC device or pressing the NFC key 350 (or power key 355) while in the proximity of the second NFC device.

Figure 5:
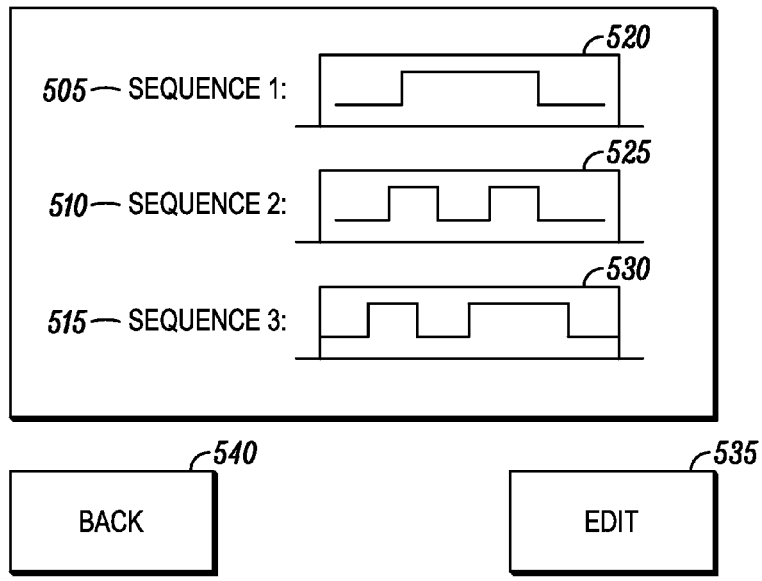
FIG. 5 illustrates an exemplary user interface executed by the mobile device in accordance with yet another embodiment.

FIG. 5 depicts an exemplary user interface 500 executed by the mobile device 105. As shown in FIG. 5, the user can be shown user interface 500 by navigating the appropriate configuration menu of the mobile device 105. The user interface 500 can display the three key press sequences 505-515, respectively. The user interface 500 can also display an associated field with each key press sequence: sequence 1 field 520, a sequence 2 field 525, and a sequence 3 field 530. Each of the fields 520-530 can be configured to accept a name (or pointer) to an NFC application. The user can use scroll buttons of the mobile device 105 or a touch screen to navigate to a particular field 520-530. The user can then activate the edit button 535 to display a list of possible applications to associate with the selected field (not shown). Once the application is selected, the user interface 500 reappears with the selected application in the appropriate field. The user can then activate the back button 540 to save the selection and return to a previous menu in some embodiments.

Figure 6:
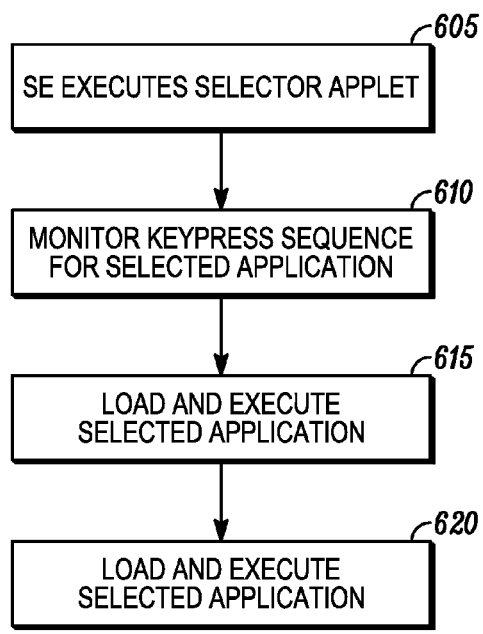
FIG. 6 illustrates an exemplary flow diagram in accordance with yet another embodiment.

FIG. 6 shows a flow diagram 600 executed by the selector module 360 in accordance with yet another embodiment. It should be readily apparent to those of ordinary skill in the art that the flow diagram 600 depicted in FIG. 6 represents a generalized schematic illustration and that other steps may be added or existing steps may be removed or modified.

As shown in FIG. 6, as the mobile device 105 enters the operating range of an NFC initiator device, the SE 320 can energize and execute the selector applet 360, in step 605. More particularly, the SE 320 can be configured to select the selector applet 360 based on the condition of the mobile device 105 being in a battery off mode.

In step 610, the selector applet 360 can monitor the NFC button 350 and/or the power button 355 depending on the configuration of the mobile device 105.

In step 615, the selector applet 360 can be configured to receive the key-press sequence entered by the user. More particularly, the user will enter one of the three key-press sequences 305-315 as shown in FIG. 4. The selector applet 360 can then select and execute the selected application.

Certain embodiments may be performed as a computer program. The computer program may exist in a variety of forms both active and inactive. For example, the computer program can exist as software program(s) comprised of program instructions in source code, object code, executable code or other formats; firmware program(s); or hardware description language (HDL) files. Any of the above can be embodied on a computer readable medium, which include storage devices and signals, in compressed or uncompressed form. Exemplary computer readable storage devices include conventional computer system RAM (random access memory), ROM (read-only memory), EPROM (erasable, programmable ROM), EEPROM (electrically erasable, programmable ROM), and magnetic or optical disks or tapes. Exemplary computer readable signals, whether modulated using a carrier or not, are signals that a computer system hosting or running the present invention can be configured to access, including signals downloaded through the Internet or other networks. Concrete examples of the foregoing include distribution of executable software program(s) of the computer program on a CD-ROM or via Internet download. In a sense, the Internet itself, as an abstract entity, is a computer readable medium. The same is true of computer networks in general.

While the invention has been described with reference to the exemplary embodiments thereof, those skilled in the art will be able to make various modifications to the described embodiments without departing from the true spirit and scope. The terms and descriptions used herein are set forth by way of illustration only and are not meant as limitations. In particular, although the method has been described by examples, the steps of the method may be performed in a different order than illustrated or simultaneously. Those skilled in the art will recognize that these and other variations are possible within the spirit and scope as defined in the following claims and their equivalents.

What is claimed is:

1. A method of selecting applications, the method comprising:
    positioning a powered-off mobile device into a close proximity of a near field communication device;
    selecting an application from a plurality of applications stored on the powered-off mobile device;
    executing the selected application in the powered-off mobile device to interact with the near field communication device;
    providing for a plurality of selection sequences; and
    associating a selection sequence with one application from the plurality of applications, wherein the selection sequence is inputted on a dedicated key on the mobile device.

2. The method of claim 1, wherein the selection of the application from a plurality of applications further comprises inputting the selection sequence for the selected application on a key of the mobile device.

3. The method of claim 1, wherein the selection of the application from a plurality of applications further comprises inputting the selection sequence for the selected application on two keys of the mobile device.

4. The method of claim 1, further comprising displaying of at least one of the selection sequences on a powered-off display.

5. The method of claim 1, wherein the selection sequence is one of a combination of different time intervals of pressing the key.

6. An apparatus for selecting an application, the apparatus comprising:
    a secure element configured to store at least two applications;
    at least one button is coupled to the secure element, wherein the at least one button is configured to accept a selection sequence to select one of the least two applications in a power off mode;
    a battery configured to supply power to the apparatus;
    a radio frequency identification antenna; and
    a radio identification controller coupled to the radio frequency identification antenna and the secure element, wherein when in the power-off mode, the secure element is configured to be powered by at least one of a residual power of the battery and a radio frequency field of a near field communication device detected by the radio identification controller by the radio frequency identification antenna,
    wherein the at least one button is a dedicated near field communication button.

7. The apparatus of claim 6, wherein the at least one button is a power button for the mobile device.

8. The apparatus of claim 7, wherein the power button is configured to ground an input to the secure element.

9. The apparatus of claim 6, wherein the mobile device is one of a mobile telephone, a computing device, a personal digital assistant and a music playing device.

10. The apparatus of claim 6, further comprising a bistatic display configured to indicate at least one of the selection sequences in a power off mode.

11. A system for selecting an application in a power off mode, the system comprising:
    a near field communication device emitting a radio frequency identification field in accordance with near field communications standards; and
    a mobile device comprising a secure element configured to store at least two applications and at least one input means is coupled to the secure element, wherein the at least one input means is configured to accept a selection sequence to select one of the at least two applications in a power off mode while in the radio frequency identification field, the mobile device further includes a radio frequency identification antenna and a radio identification controller coupled to the radio frequency identification antenna and the secure element, wherein when in the power-off mode, the secure element is configured to be powered by at least one of a residual power of the battery and a radio frequency field of a near field communication device detected by the radio identification controller by the radio frequency identification antenna, wherein the at least one input means is a dedicated near field communication button.

12. The system of claim 11, wherein the dedicated near field communication button includes a power button for the mobile device being configured to ground an input of the secure element.

13. The system of claim 11, wherein the mobile device further comprising a bistatic display configured to indicate the selection sequences in a power off mode.

14. The system of claim 11, wherein the mobile device is one of a mobile telephone, a computing device, a personal digital assistant and a music playing device.

* * * * *